UNITED STATES PATENT OFFICE.

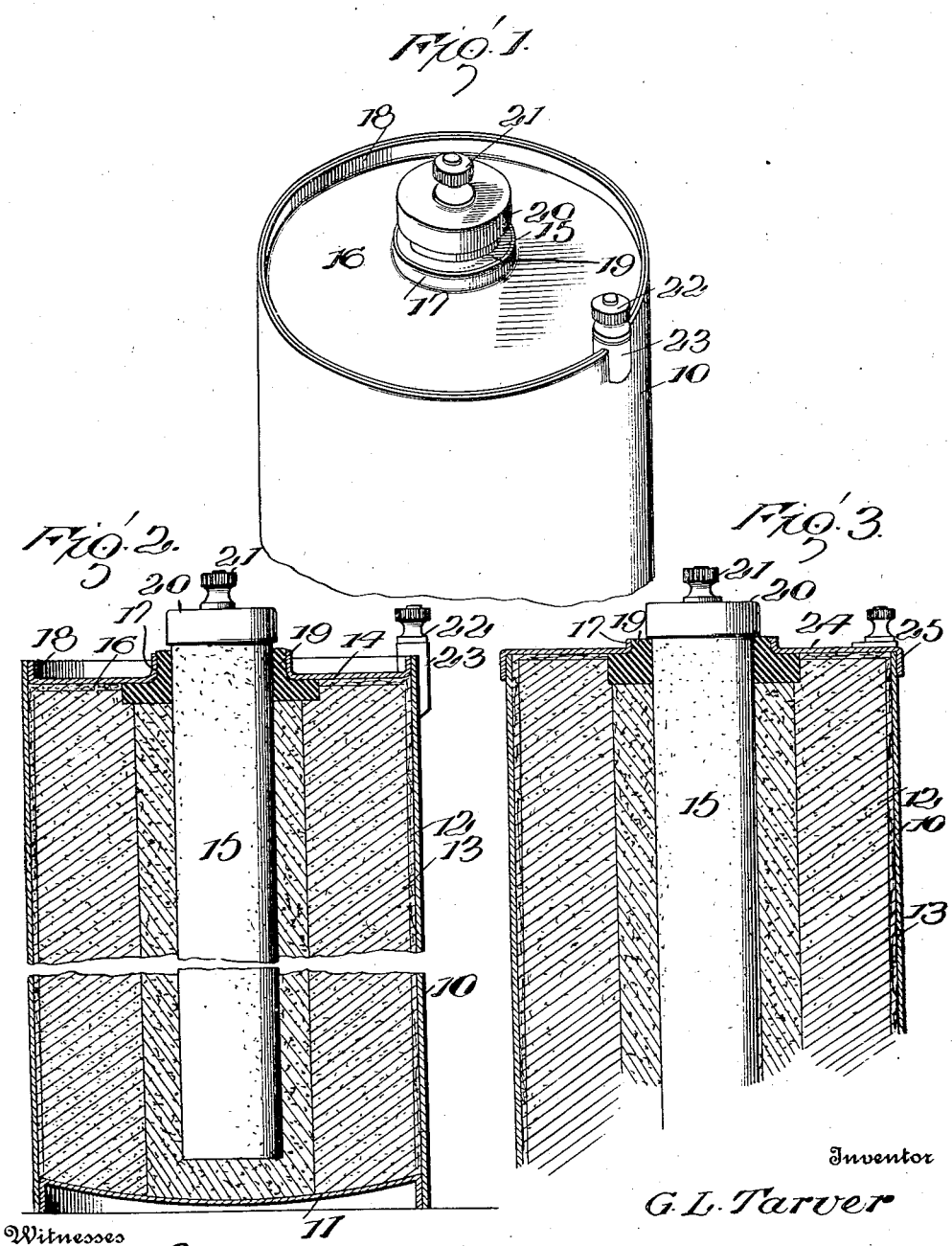

GEORGE LOUIS TARVER, OF OAKLAND, CALIFORNIA.

DRY CELL.

1,203,279.  Specification of Letters Patent.  Patented Oct. 31, 1916.

Application filed January 4, 1915. Serial No. 487.

*To all whom it may concern:*

Be it known that I, GEORGE LOUIS TARVER, a citizen of the United States, residing at Oakland, in the county of Alameda and State of California, have invented certain new and useful Improvements in Dry Cells, of which the following is a specification.

This invention relates to new and useful improvements in dry cells, the primary object of the invention being the provision of a dry cell which will be more efficient, which will generate more electrical energy and which will not deteriorate as rapidly.

A further object of the invention consists in the provision of a dry cell in which all parts of the cell are electro-chemically active, thereby avoiding waste.

In this connection, a still further object of the invention is to do away with the usual closure for the zinc cup forming the body of the cell, which closure is of wax and to replace this by a zinc cap in order that the cap, as well as the cup or body of the cell, may form an active constituent of the cell.

With these and other objects in view, the invention will be more fully described, illustrated in the accompanying drawing, and then specifically pointed out in the claim which is attached to and forms a part of this application.

In the drawing: Figure 1 is a fragmentary perspective view of a dry cell constructed in accordance with my invention; Fig. 2 is a central vertical sectional view of the type of cell shown in Fig. 1; Fig. 3 is a view corresponding to that shown in Fig. 2, illustrating a somewhat modified form of construction.

Corresponding and like parts are referred to in the following description and indicated in all the views of the drawings by the same reference characters.

The improved dry cell includes a cup or body 10 of zinc forming the positive electrode of the cell and having a bottom 11 also of zinc either formed integrally with the body portion 10 or soldered in the lower end thereof as shown in Fig. 2. This zinc cup is lined with any suitable lining 12 such as is commonly used in the manufacture of dry cells and the semi-plastic mass 13 carrying the liquid electrolyte is placed in this cup, the lining being extended over this electrolyte as shown at 14 and provided with a central opening to receive the negative electrode 15. This electrode is in the form of a carbon rod or bar and extends at its lower end nearly to the bottom of the cup 10.

The upper end of the cup is closed by a zinc cap 16 provided with a central opening surrounded by an upstanding annular flange 17 which is spaced from the negative electrode 15. The peripheral edge of the cap is also provided with an upstanding flange 18 which fits snugly in the upper end of the cup, being soldered to the wall of the cup to provide an absolutely tight closure. A relatively small amount of wax 19 is employed to seal and secure the negative electrode 15 in the central opening of the cap 16, this wax not only serving as a securing means for the electrode, but also as a means for insulating the negative electrode 15 from the cap 16 which forms a portion of the positive electrode of the cell.

The outer end of the negative electrode 15 is, preferably, provided with a metallic cap 20 having a binding post 21 of any suitable construction. A second binding post 22 is secured to the cup in any suitable manner. In Fig. 2 I have illustrated this binding post as including a bifurcated body portion 23, the arms of which straddle the upstanding edge of the cup 10 to which they are soldered or otherwise suitably secured.

In Fig. 3 I have illustrated a slightly modified form of the invention in which the sole difference consists in the fact that the cap or closure, here indicated by the numeral 24, instead of having the upturned marginal flange 18, is formed with a downturned marginal flange 25 proportioned to fit snugly about the upper end of the cell 10 and to be soldered to the cell.

As will be readily appreciated from the foregoing description, all parts of the cell, save the relatively small amount of wax employed, are electro-chemically active, the entire cup and cap forming the positive electrode, while the carbon rod forms the negative electrode. Practically, the entire length of the carbon rod is surrounded by the electrolyte, under these circumstances, whereas with the conventional type of dry cell, a half inch to an inch of this rod is rendered inactive by being surrounded with the wax employed as a seal for the cup. Furthermore, this wax so employed is not only an inactive element in the cell, but in effect offers considerable resistance to the current and increases the resistance of the cell. In addition to this, a wax closure is inefficient in hot climates as it will melt and blow out, or else crack away from either the cup or the carbon rod and thus permit the contents of the cell to dry out.

It will of course be understood that I do not wish to limit myself to the specific manner of securing the zinc cap to the cup, my invention residing rather in the provision of such a cap as a substitute for the wax seal ordinarily employed. For instance, referring to Figs. 2 and 3, it is of course optional whether the metal cap is soldered to the body or whether its edges and the edges of the body are turned and pressed together or whether it has threaded engagement with the body or in fact in what manner it is secured to the body. The surface of the cup and cap may be smooth, roughened, or corrugated and such parts may be made in any desired shape and size. I have not illustrated any method of folding and pressing the edges of the body and cap or the body or bottom together as such sheet metal joints are well known. However, it will be clear that the use of such joints will obviate the necessity of soldering the parts together and I therefore do not wish to be limited to any specific manner of fastening such parts.

Having thus described the invention, what is claimed as new is:

A dry cell including a cup, a cap fitted to the top of the cup and provided with an upstanding flange defining an opening, said cap and cup together constituting a positive electrode, an electrolyte filling the cup, a negative electrode extending through the opening in the cap and into the electrolyte and spaced from the flange, and a body of insulating material interposed between the flange and negative electrode and disposed in direct contact therewith, the cap between the flange and cup being imperforate.

In testimony whereof I affix my signature in presence of two witnesses.

GEORGE LOUIS TARVER. [L. S.]

Witnesses:
 A. L. MORRISON,
 F. ANDERSON.